Patented Aug. 14, 1951

2,563,871

UNITED STATES PATENT OFFICE 2,563,871

UNSATURATED POLYHYDRIC PHENOLIC ETHER-MODIFIED ROSIN ESTERS AND PROCESS OF MAKING SAME

John B. Rust, East Hanover, and William B. Canfield, Montclair, N. J., assignors, by direct and mesne assignments, of one-half to Montclair Research Corporation, a corporation of New Jersey, and one-half to Ellis-Foster Company, a corporation of New Jersey No Drawing. Application November 12, 1947, Serial No. 785,543

9 Claims. (Cl. 260—27)

The present invention relates to new modified rosin esters and to the process for the preparation of the same. More particularly, it relates to the reaction products of rosin or rosin-containing esters with unsaturated polymerizable polyhydric phenolic compounds containing two or more beta-unsaturated aliphatic groups of from 3 to 4 carbon atoms. Such unsaturated polymerizable phenolic compounds are exemplified by polyvalent aromatic hydrocarbon allyl ethers and esters, represented by the general formula $$P[-O(CH_2COO)_x-R]_y$$

where P is a polyvalent mononuclear or polynuclear aromatic hydrocarbon radical such as o-, m- or p-phenylene, methyl-phenylene, dimethylphenylene, naphthylene, diphenylene, alkylene-bis-phenylene (e. g., methylene-bis-phenylene, isopropylidene-bis-phenylene, methyl - ethylmethylene - bis - phenylene, cyclohexylidene-bis-phenylene, methyl-isobutylmethylene-bis-methylene, etc.), or a trivalent benzene or naphthalene radical; R is a beta-unsaturated aliphatic radical (e. g., allyl) having from 3 to 4 carbon atoms; $x$ is a number equal to 0 or 1, and $y$ is a number equal to 2 or 3 and is equal to the valence of the aromatic hydrocarbon radical.

The unsaturated phenolic compounds used herein are high-boiling, pale-yellow liquids characterized by the common grouping of an oxygen atom attached to an aromatic ring and to a beta-unsaturated aliphatic group or to a beta unsaturated monohydric alcohol ester of an aliphatic monocarboxylic acid. They tend to set up to hard, brittle, resinous masses when heated at 150°–200° C. Such polymeric products may therefore be formed without the use of peroxides or acidic catalysts. When thickened to a syrup and baked in the form of thin films, hard brittle masses are formed which are exceedingly alkali-resistant. When these unsaturated phenolic compounds are polymerized by themselves in the presence of heat, characteristic red to dark brown color-bodies are formed which give rise to the production of characteristically dark products. On the other hand, when they are combined with rosin or rosin-containing esters, reaction is fairly rapid and they unexpectedly give light-colored, hard, brittle resins which when saponified are completely soluble in water. When the aqueous solutions are acidified and the hydrolytic products are washed and dried, the acids from these modified rosin products show acid numbers of 100–180, depending upon the amount of unsaturated phenolic compound employed.

These modified rosin-containing products are light-colored, hard, brittle resins which, in the case of rosin esters, possess a low acid number.

Thus, the following objects of the present invention are apparent:

(1) To provide a soluble, modified rosin-containing ester which will be heat advancing in drying oil varnish formulations.

(2) To provide a soluble, modified rosin-containing ester which upon cooking with drying oils such as linseed oil, soya bean oil, and the like will form fast drying, alkali resistant coatings.

(3) To provide a soluble, modified rosin-containing ester which will increase the speed of body and the subsequent speed of drying of the so-called slow drying oils such as linseed oil, soya bean oil, and the like.

(4) To provide a soluble, modified rosin-containing ester which, in combination with linseed oil, will be non-yellowing in baked coatings.

Other objects of the present invention will become apparent from the more detailed description set forth below.

These objects are attained by heating the unsaturated phenolic compound with abietic acid radical-containing material including rosin, a rosin ester (particularly a polyhydric alcohol ester), a rosin-modified alkyd resin, a mixture of rosin and a polyhydric alcohol (e. g., glycerol, pentaerythritol, etc.) in stoichiometrical proportions to form a rosin ester, and a mixture of rosin, a polyhydric alcohol and a polycarboxylic acid (e. g., phthalic, succinic, adipic, sebacic, etc.) in stoichiometrical proportions to form a rosin-modified alkyd resin. The rosin material and the unsaturated phenolic compound are heated together in a suitable reactor at a temperature of 200° to 300° C. until the reaction is substantially complete as shown by no more refluxing of the unsaturated phenolic compound. Heating is then continued until the reaction product reaches the desired hardness. In practice, an inert atmosphere of carbon dioxide or nitrogen may be employed to prevent any oxidation of the resin, although its use is not essential. Neither is it necessary to employ a catalyst in the reaction, since combination takes place in the presence of heat alone as already described. The resulting resins are clear, hard and brittle, and exceedingly pale in color. The resins prepared from rosin esters or rosin ester-forming mixtures possess acid numbers of 2 to 20.

The products of the present invention may be blended with nitrocellulose esters to form nitrocellulose lacquers which show a surprisingly rapid rate of solvent release. These resins when modified with drying oils, particularly the so-called soft drying oils such as linseed oil or soya bean oil, provide exceedingly fast drying coating compositions which possess an excellent resistance to dilute aqueous alkali. They may also be combined with styrene, acrylic acid esters, methacrylic acid esters, acrylonitrile, and the like to obtain products useful to those skilled in the art.

In practicing the process of the present invention as little as 1% and as much as 50% of the unsaturated phenolic product (based on the rosin or rosin ester) may be employed. However, proportions of 10% to 30% of the unsaturated phenolic compound are to be preferred, since these proportions impart the desired degree of modification to the rosin or rosin esters. The higher proportions of the unsaturated phenolic compound give resins which possess higher softening points and impart a better alkali resistance to the varnish formulations in which the resins are employed.

We do not wish to limit ourselves to any theoretical explanation of the reaction, although it is probable that it involves addition. It is presumably an addition of the unsaturated allyl groups (or other unsaturated hydrocarbon groups) of the phenolic ether to the unsaturated acid radicals of the rosin, since initially the resins prepared from rosin and the unsaturated phenolic ether are completely alkali-soluble.

It is possible to employ dicarboxylic acid-modified rosin esters in place of rosin or the polyhydric alcohol-rosin esters. Also, as noted above it is within the scope of the present invention to provide modified rosin esters wherein rosin, polyhydric alcohol, and unsaturated phenolic product, or rosin, polyhydric alcohol, polycarboxylic acid and the unsaturated phenolic compound, are reacted together simultaneously.

There are, of course, numerous unsaturated phenolic compounds of the type employed in the practice of the present invention. For the purpose of illustration these include the beta-unsaturated alkyl (e. g., allyl) ethers of such polyhydric phenols as pyrocatechol, resorcinol, hydroquinone, orcinol, toluhydroquinone, dihydroxyxylenes, pyrogallol, phlorglucinol, hydroxyhydroquinone, di- and trihydroxynaphthalenes, diphenylol, diphenylolmethane and the reaction products of 2 moles of a monohydric phenol with 1 mole of a ketone (e. g., acetone, methyl ethyl ketone, methyl isobutyl ketone, cyclohexanone, etc.) such as diphenylolpropane, diphenylolbutane, diphenylolhexane, diphenylolcyclohexane and the like.

The ethers are made in known manner by reacting the above polyhydric phenols with an unsaturated halide such as allyl chloride or bromide, methallyl chloride, 3-chlorobutene or crotyl chloride, and the ether-esters are advantageously made by reacting the polyhydric phenol with a monohalogenated acetic acid (preferably chloroacetic acid on account of its ease of reaction and availability) and then esterifying the aryloxy-substituted acetic acid with an unsaturated alcohol such as allyl, methallyl, butenyl or crotyl.

While most of the examples herein teach the use of the rosin ester of glycerol (ester gum), it is apparent that rosin ester such as pentaerythrityl tetraabietate, mannityl abietate, and the like may also be used. Within this classification may also be considered such natural gums as copal, gum elemi, sandarac, thus, and the like, since these also undergo the reactions herein described.

The following examples are given by way of illustration only and should not be considered as limiting. All proportions are in parts by weight.

Example 1

100 parts of glyceryl triabietate (ester gum) and 25 parts of the diallyl ether of diphenylolpropane are heated together in a 500-ml., 3-neck flask equipped with a thermometer, stirrer, and air-condenser. Heating is carried out at 250°–260° C. for 6 hours. A light-colored, hard, brittle resin is obtained having a ring and ball softening point of 108° C.

50 parts of the above resin and 80 parts of Z–2 bodied linseed oil are heated together to 280° C. in ½ hour. Heating is thereafter continued at 280°–290° C. for 90 minutes. The resulting varnish base is thinned to 50% solids with V. M. and P. naphtha. The varnish possesses a Gardner viscosity of F. To the above varnish is added 0.5% lead as lead naphthenate and 0.075% cobalt as cobalt naphthenate based upon the oil content of the varnish. The varnish air-dries to a non-tacky film in 4¼ hours. After 24 hours the air-dried film possesses a Sward Rocker hardness of 53.

Example 2

100 parts of glyceryl triabietate (ester gum) and 40 parts of the diallyl ether of diphenylolpropane are heated together in a 500-ml., 3-neck flask equipped with a thermometer, stirrer, and air-condenser. Heating is carried out at 260°–270° C. for 4¾ hours. A light-colored, hard resin is secured, having a ring and ball softening point of 102° C.

50 parts of the above resin and 80 parts of Z–2 bodied linseed oil are heated together to 380° C. in ½ hour. Heating is thereafter continued at 280°–290° C. for 55 minutes. The resulting varnish base is thinned to 50% solids with V. M. and P. naphtha. The varnish has a Gardner viscosity of F–G. To the above varnish is added 0.5% lead as lead naphthenate and 0.075% cobalt as cobalt naphthenate based upon the oil content of the varnish. The varnish air-dries to a tack-free film in 3¾ hours. After 24 hours the air-dried film possesses a Sward Rocker hardness of 61.

Example 3

60 parts of glyceryl triabietate (ester gum) and 10 parts of the triallyl ether of pyrogallol are heated together in a 500-ml., 3-neck flask equipped with a thermometer, stirrer, and air-condenser. Heating is carried out at 250°–260° C. for 10 hours. A hard, brittle resin results having an acid number of 7 and a ring and ball softening point of 91° C.

Example 4

75 parts of glyceryl triabietate (ester gum) and 12.5 parts of the dimethallyl ether of resorcinol are heated together in a 500-ml., 3-neck flask equipped with a thermometer, stirrer, and air-condenser. Heating is carried out at 250°–260° C. for 12 hours. A hard, brittle resin is secured having an acid number of 9.4 and a ring and ball softening point of 93° C.

50 parts of the above resin, 50 parts of isopropanol, and 50 parts of a 20% aqueous caustic soda solution are refluxed together for 2 hours at boiling to form a clear aqueous solution. After acidifying, washing and drying, a water-insoluble hydrolytic product is obtained having an acid number of 139.

*Example 5*

50 parts of rosin, 10 parts of commercial pentaerythritol, 10 parts of phthalic anhydride, and 12 parts of the diallyl ether of diphenylolpropane are heated together in a 500-ml., 3-neck flask provided with a stirrer, thermometer, and water-trap connected to a water-cooled condenser. Heating is carried out at 200°–240° C. for 8 hours, while collecting 4.2 parts of distillate in the water-trap. A hard, light-colored resin is secured which possesses an acid number of 17.3 and a ring and ball softening point of 87° C.

*Example 6*

100 parts of glyceryl triabietate (ester gum) and 10 parts of the diallyl ester of diphenylolpropane diacetic acid are heated together in a 500-ml., 3-neck flask equipped with a thermometer, stirrer, and air-condenser. Heating is carried out at 240° C.–250° C. for 6½ hours. A light-colored clear resin is secured which possesses a ring and ball softening point of 107° C.

*Example 7*

100 parts of glyceryl triabietate (ester gum) and 25 parts of the diallyl ester of diphenylolpropane diacetic acid (diallyl isopropylidene-bis-phenoxyacetate) are heated together in a 500-ml., 3-neck flask equipped with a thermometer, stirrer, and air-condenser. Heating is carried out at 250°–260° C. for 8 hours. A light-colored, brittle resin is obtained having a ring and ball softening point of 112° C.

50 parts of the above resin and 80 parts of Z–2 bodied linseed oil are heated together to 280° C. in ½ hour. Heating is continued at 280°–290° C. for 35 minutes. The resulting varnish base is thinned to 50% solids. 0.5% lead and 0.075% cobalt driers as naphthenates based upon the oil content of the varnish is added. The resulting varnish air-dries to a tack-free film in 4¼ hours. After 24 hours, the dried varnish film possesses a Sward Rocker hardness of 67.

*Example 8*

50 parts of pentaerythritol abietate and 5 parts of the diallyl ester of resorcinol diacetic acid are heated together in a 500-ml., 3-neck flask equipped with a thermometer, stirrer, and air-condenser. Heating is carried out at 240°–250° C. for 5½ hours. A light-colored, brittle resin is secured having a ring and ball softening point of 102° C.

*Example 9*

Fifty parts of a rosin modified phthalic glyceride of acid number 15 and 10 parts of the diallyl ether of diphenylolpropane are heated together in a 500 ml., 3-neck flask equipped with a stirrer, thermometer, and water-cooled condenser to 200° C. in one hour. Thereafter heating is continued at 240° C.–250° C. for 6½ hours. A light-colored, hard, brittle resin is secured which possesses a ring-and-ball softening point of 79° C.

It will be understood that it is intended to cover all changes and modifications of the examples of the invention herein chosen for the purpose of illustration which do not constitute departures from the spirit and scope of the invention.

We claim:

1. A resinous composition comprising the reaction product at between 200° and 300° C. of (a) a natural gum component selected from the group consisting of the natural gums rosin, copal, gum elemi, sandarac and thus, the polyhydric alcohol esters of said natural gums, and alkyd resins modified by said natural gums, with from 1% to 50% of (b) a polyhydric phenolic unsaturated ether having the formula $$P(\text{—OCH}_2\text{COOR})_y$$

wherein P is an aromatic hydrocarbon polyvalent radical, R is a beta-unsaturated olefinic radical containing from 3 to 4 carbon atoms, and y is the valence of the radical P and is a number selected from 2 and 3.

2. The resinous composition of claim 1 wherein the phenolic compound is diallyl isopropylidene-bis-phenoxyacetate.

3. A composition comprising the reaction product at between 200° and 300° of a rosin ester of a polyhydric alcohol with from 1% to 50% of a polyhydric phenolic unsaturated ether having the formula $P(\text{—OCH}_2\text{COOR})_y$, wherein P is an aromatic hydrocarbon polyvalent radical, R is a beta-unsaturated olefinic radical containing from 3 to 4 carbon atoms, and y is the valence of the radical P and is a number selected from 2 and 3.

4. A composition comprising the reaction product at between 200° and 300° C. of a rosin-modified alkyd resin with from 1% to 50% of a polyhydric phenolic unsaturated ether having the formula $P(\text{—OCH}_2\text{COOR})_y$, wherein P is an aromatic hydrocarbon polyvalent radical, R is a beta-unsaturated olefinic radical containing from 3 to 4 carbon atoms, and y is the valence of the radical P and is a number selected from 2 and 3.

5. A composition comprising the reaction product at between 200° and 300° C. of ester gum with from 1% to 50% of polyhydric phenolic unsaturated ether having the formula $$P(\text{—OCH}_2\text{COOR})_y$$

wherein P is an aromatic hydrocarbon polyvalent radical, R is a beta-unsaturated olefinic radical containing from 3 to 4 carbon atoms, and y is the valence of the radical P and is a number selected from 2 and 3.

6. A composition comprising the reaction product at between 200° C. and 300° C. of ester gum with from 1% to 50% of diallyl isopropylidene-bis-phenoxyacetate.

7. The process of making a resinous composition which comprises heating at between 200° and 300° C. a natural gum component selected from the group consisting of the natural gums rosin, copal, gum elemi, sandarac and thus, the polyhydric alcohol esters of said natural gums, and alkyd resins modified by said natural gums, with from 1% to 50% of a polyhydric phenolic unsaturated ether having the formula $$P(\text{—OCH}_2\text{COOR})_y$$

wherein P is an aromatic hydrocarbon polyvalent radical, R is a beta-unsaturated olefinic radical containing from 3 to 4 carbon atoms, and y is the valence of the radical P and is a number selected from 2 and 3.

8. The composition as in claim 1 in which the phenolic compound is diallyl ester of resorcinol diacetic acid.

9. The composition as in claim 8 in which the rosin compound is pentaerythritol abietate.

JOHN B. RUST.
WILLIAM B. CANFIELD.

REFERENCES CITED

The following references are of record in the file of this patent:

UNITED STATES PATENTS

| Number | Name | Date |
|---|---|---|
| 2,285,797 | Bellefontaine et al. | June 9, 1942 |